(12) United States Patent
Gruden

(10) Patent No.: US 6,175,292 B1
(45) Date of Patent: Jan. 16, 2001

(54) ELECTRICAL ACTUATOR

(75) Inventor: James M Gruden, Centerville, OH (US)

(73) Assignee: Kelsey-Hayes Company, Livonia, MI (US)

(*) Notice: Under 35 U.S.C. 154(b), the term of this patent shall be extended for 0 days.

(21) Appl. No.: 09/397,985

(22) Filed: Sep. 16, 1999

(30) Foreign Application Priority Data

Sep. 18, 1998 (GB) .................................................. 9820243

(51) Int. Cl.[7] .............................. H01F 5/00; H01F 7/00; H01F 7/08
(52) U.S. Cl. .......................... 335/267; 335/266; 335/268
(58) Field of Search .................................. 335/255, 259, 335/261–264, 266, 267, 268

(56) References Cited

U.S. PATENT DOCUMENTS

| | | | | |
|---|---|---|---|---|
| 3,821,673 | * | 6/1974 | Daugherty et al. | 335/267 |
| 4,546,955 | * | 10/1985 | Beyer et al. | 251/129.15 |
| 5,422,617 | * | 6/1995 | Brown | 335/267 |

* cited by examiner

Primary Examiner—Lincoln Donovan
Assistant Examiner—Ray Barrera
(74) Attorney, Agent, or Firm—Andrus, Sceales, Starke & Sawall

(57) ABSTRACT

An electrical park latch actuator for the automatic transmission selector lever of a road vehicle, the actuator including a support member, first and second electromagnet windings carried by a common electromagnet core of the support member, and first and second plungers moveable relative to the support member, and responsive to energization of the first and second electromagnet windings respectively, said first and second plungers being positioned with their movement axes parallel and part of said second plunger being slidably received within said first plunger.

7 Claims, 1 Drawing Sheet

ELECTRICAL ACTUATOR

BACKGROUND OF THE INVENTION

This invention relates to an electrical park latch actuator for the automatic transmission selector lever of a road vehicle.

It is usual for the selector lever of a vehicle automatic transmission system to incorporate a manually operable release button or the like which must be operated by the vehicle driver in order to release a latch mechanism permitting the selector lever to be moved between certain operating positions. For example, it is usual for the lever to be latched in the "Park" position so that the release button must be operated to permit the lever to be moved from the park position.

For safety reasons it is usual for there to be a requirement that both the ignition switch of the vehicle is in the "on" position and the brake pedal of the vehicle is depressed before the release button can be operated to release the latch mechanism freeing the selector lever for movement from the park position.

Conventionally, as illustrated in, for example, U.S. Pat. No. 5,489,246, the ability to operate the release button, to free the selector level for movement from its park position, is controlled by a first solenoid responsive to energization of the ignition circuits of the vehicle, and a second solenoid responsive to the position of the brake pedal of the vehicle. The first and second solenoids include plungers which cooperate independently of one another with respective cam/abutment regions of a pushrod moving with the release button.

It is an object of the present invention to provide an electric park latch actuator which can be responsive to the energization of the ignition circuit of the vehicle and the depression of the brake pedal of the vehicle in a simple and convenient form.

SUMMARY OF THE INVENTION

In accordance with the present invention there is provided an electrical park latch actuator including support member, first and second electromagnet windings carried by the support member, and first and second plungers moveable relative to the support member and responsive to energization of the first and second electromagnet windings respectively, said first and second plungers being positioned with their movement axes parallel, and part of said second plunger being slidably received within said first plunger.

Preferably said first and second plungers have their movement axes coextensive.

Desirably said first and second plungers are urged by respective return springs into the path of movement of an element moveable with the release button of the associated transmission selector lever in use, and said first plunger includes a cam surface cooperable with said element.

Preferably said support member includes an electromagnet core common to both electromagnet windings.

Conveniently said first plunger is hollow, and said support member is received therein.

Conveniently said first plunger is hollow, and said second plunger is received therein.

Desirably said first plunger includes a manually operable interlock selectively engageable with said second plunger, whereby movement of said first plunger against the action of its return spring carries the second plunger with it against the action of its return spring.

BRIEF DESCRIPTION OF THE DRAWINGS

One example of the invention is illustrated in the accompanying drawings wherein.

DETAILED DESCRIPTION OF THE INVENTION

Figure 1:
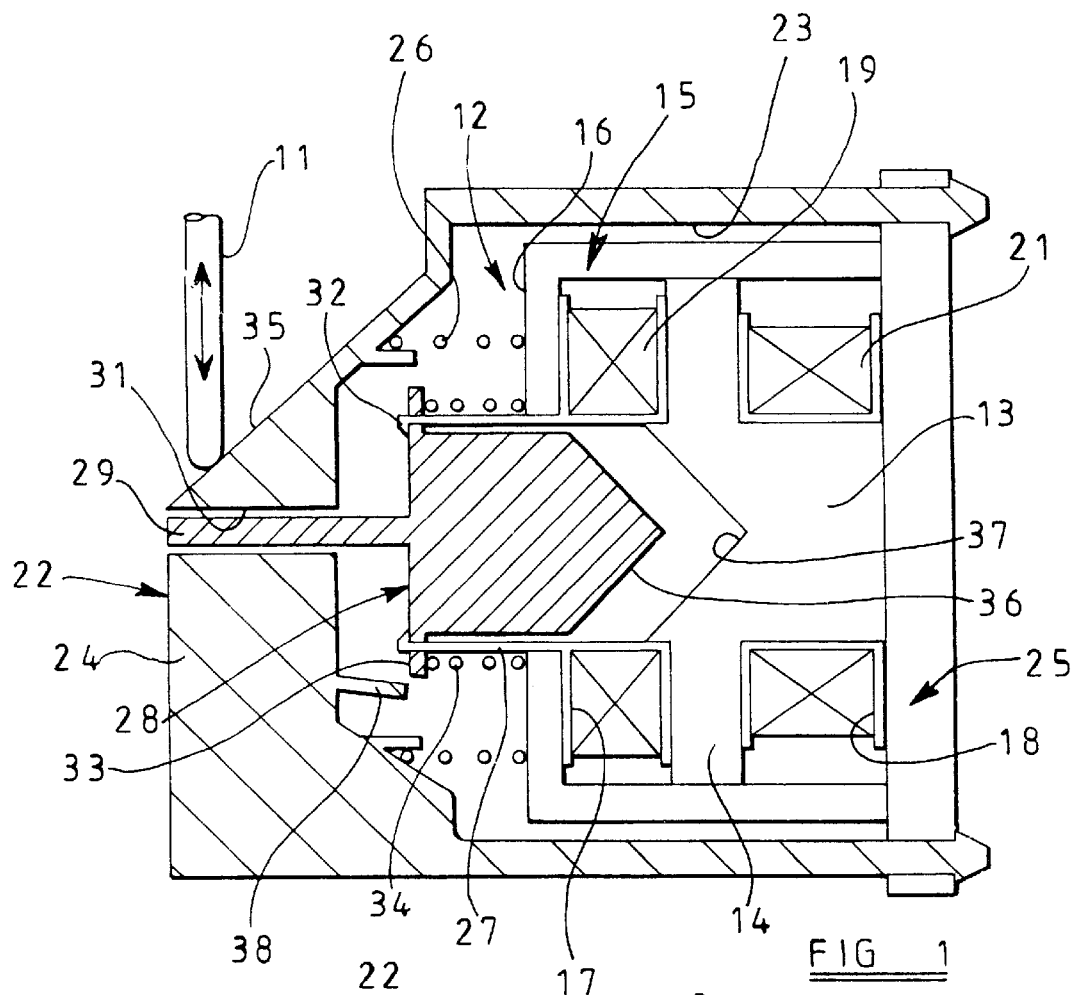
FIG. 1 is a diagrammatic cross-sectional view of an electrical park latch actuator.

Referring first to FIG. 1 of the accompanying drawings reference numeral 11 identifies an axially moveable pushed forming part of the selector lever assembly of the automatic transmission of a road vehicle. The pushed 11 is associated with a park latch release button of the selector lever and is moveable vertically downward from the position illustrated in FIG. 1, against the action of a light return spring (not shown), by depression of the release button to release the latching mechanism which locks the selector lever in its "Park" position. It will be understood that if the downward axial movement of the rod 11 is prevented then the latch mechanism of the selector lever cannot be released, and the selector lever cannot be moved from its park position.

The pushrod 11 cooperates with the electric park latch actuator 12 so that the actuator controls when the rod 11 can be moved to permit release of the selector lever from its park position.

The park latch actuator 12 includes a support member which, in use, is fixed and provides a mounting arrangement (not shown) whereby the actuator is secured within the vehicle adjacent the transmission selector lever in use. The support member includes an electromagnet core 13 and an outer, hollow, frame 15. The core 13 is generally cylindrical, being of circular cross-section, and includes an integral, radially outwardly extending, peripheral flange 14 adjacent one axial end thereof. The core 13 and frame 15 are formed from ferromagnetic material, and the frame 15, which conveniently is also of circular cross-section, has the core 13 mounted coaxially therein by means of the flange 14. The outer, face of the flange 14 engages the inner surface of the frame 15 partway along the length of the frame 15, and one axial end of the frame 15 is partially closed by a radially inwardly extending, integral, peripheral flange 16.

Housed within the annular volume defined between the outer surface of the core 13 and the inner surface of the frame 15 are first and second annular, moulded synthetic resin coil formers 17, 18. The coil formers 17, 18 are positioned with their axes coextensive with the axes of the core 13 and frame 15 and are axially spaced from one another by the flange 14. Each of the formers 17, 18 supports a respective electromagnet winding 19, 21 the windings thus having their axes coextensive with the axis of the core 13.

The actuator 12 further includes a first, hollow, plunger 22. As will become apparent is it not necessary for the plunger 22 to be formed from a ferromagnetic material, and the plunger 22 can therefore be a synthetic resin moulding, or a zinc alloy die-casting or the like. The support member assembly 13, 15 carrying the windings 19, 21 is coaxially received within the bore 23 of the plunger 22. Axially extending slots (not shown) are formed in the wall of the plunger 22 and mounting tabs (not shown) extending radially outwardly from the support member 13, 15 project through the slots to permit the actuator to be fixed in the vehicle body in use. It will be recognised therefore that in use the support member 13, 15 together with the windings 19, 21 are fixed and the plunger 22 can move axially relative thereto.

The plunger 22 has a closed end 24 presented to the flange 16 of the frame 15. The opposite end of the frame 15 and the end of the core 13 remote from the flange 14 define parts of common, planar surface at right angles to the axis of the core 13 and frame 15 and a planar, ferromagnetic disc 25, attached at its periphery to the plunger 22, can abut the coplanar ends of the core 13 and frame 15. A helically wound compression spring 26 of relatively light rating, acts between the flange 16 and the closed end 24 of the plunger 22 to urge the plunger 22 to a rest position relative to the support member 13, 15, in which the disc 25 abuts the core 13 and frame 15.

The former 17 carrying the electromagnet winding 19 has a hollow, integral, cylindrical extension 27 of circular cross-section which extends through the central aperture of the flange 16 towards the closed end 24 of the first plunger 22. Slidable axially within the extension 27 is a second plunger 28, the plunger 28 being of circular cross-section, and being formed from a ferromagnetic material. The plunger 28 includes an axial extension 29 which protrudes into a corresponding through bore 31 in the closed end wall 24 of the first plunger 22.

The extension 27 is divided, by a plurality of axially extended slots, to define a plurality of axially extending fingers 32 which extend through respective apertures in a radially outwardly extending, integral, flange 33 of the plunger 23. At their free ends the fingers 32 are bent inwardly to engage an end face of the second plunger 28 to define an abutment against which the plunger 28 is urged by a helically wound compression spring 34 also of a relatively light rating. The spring 34 extends between the flange 16 of the frame 15 and the flange 33 of the second plunger 28, and the position of the abutment surfaces defined by the fingers 32 is such that when the first and second plungers 22, 28 occupy their rest positions, under the action of their respective return springs 26, 34, then the free end of the extension 29 of the plunger 28 is substantially flush with the outer surface of the end wall 24 of the plunger 22.

The end surface 24 of the plunger 22 is cut away to define an inclined cam surface 35 with which the free end of the pushrod 11 can cooperate.

The operation of the actuator is as follows.

The electromagnet windings 19 and 21 are both energized by movement of the vehicle ignition switch to an "on" position so that the ignition circuits of the vehicle are energized. However, the winding 21 is associated with the brake pedal of the vehicle in use such that when the brake pedal is depressed then the winding 21 will be de-energized irrespective of the ignition switch being in its "on" position.

To understand the operation of the actuator, assume firstly that the selector lever is in its park position, and the end of the pushrod 11 is engaged with the cam 35 of the plunger 22. Assume also that both windings 19, 21 are energized because the ignition switch of the vehicle is closed, but the brake pedal has not been depressed by the driver of the vehicle. In this situation the energization of the winding 21 attracts the disc 25 firmly against the axial end faces of the core 13 and frame 15 so that the plunger 22 is held against movement to the right against the action of its return spring 26. The pushrod 11 will thus be abutting the cam 35, and will be held by the cam 35 against the vertical downward movement which is necessary in order to release the park latch of the selector lever, the electromagnetic attraction of the disc 25 to the core 13 and frame 15 being too strong to be overcome by the force which the driver is able to apply to the pushrod 11 by way of the release button of the selector lever. It will be recognised that by virtue of energization of the winding 19 the plunger 28 will have been attracted towards the core 13 so that a frusto-conical end region 36 of the plunger 28 is received within a frusto-conical recess 37 in the face of the core 13 remote from the disc 25. However, this movement of the plunger 28 is irrelevant to movement of the pushrod 11 since the plunger 22 and cam surface 35 cannot move.

It will be recognised that the actuator in effect contains first and second electromagnets having respective plungers moveable in opposite directions, and sharing a common core. The flux path of the winding 21 will be through the core 13, the flange 14, and part of the cylindrical frame 15, the frame 15 and core 13 being bridged by the disc 25. The flux path of the winding 19 includes the flange 14, a small of part of the core 13, the left-hand end of the frame 15, the flange 16 and the plunger 28. Thus energization of the winding 19 tries to close the air gap between the face 36 of the plunger and the face 37 of the core 13 while energization of the winding 21 tries to close the air gap between the disc 25 and the coplanar ends of the core 13 and frame 15.

If the operator now depresses the brake pedal of the vehicle he will cause the winding 21 to be de-energized while the winding 19 remains energized. Immediately the winding 21 is de-energized then the only force preventing movement of the plunger 22 to the right as shown in the drawing, is the return spring 27 which, as mentioned above, is of relatively light rating. Thus the driver can readily apply sufficient force to the release button of the selector lever to depress the pushrod 11 relative to the cam 35 so that the plunger 22 is driven to the right against the action of the return spring 26. The driver can therefore release the park latch freeing the selector lever for movement from its park position.

In the event that the driver attempts to release the latch mechanism while the ignition switch in an "off" position then again the only resistance to movement of the plunger 22 will be the return spring 26 which can be overriden by the action of the pushrod 11 on the cam 35. However, in this situation the plunger 28 has not been withdrawn towards the core 13 since the winding 19 is not energized. The plunger 28 and extension 29 thus remain in their rest position under the action of the second plunger return spring 34 and the extension 29 remains in the path of movement of the pushrod 11 notwithstanding the fact that the pushrod 11 has displaced the plunger 22 to the right.

The distance through which the pushrod 11 moves to displace the plunger 22 to the right and to abut the extension 29, is insufficient to release the latch mechanism locking the selector lever in its park position. Thus in a situation in which the ignition circuits of the vehicle are not energized then the extension 29 of the plunger 28 prevents latch release movement of the pushrod 11.

It will be recognised that there may be a need to move the selector lever from its park position when the ignition circuit of the vehicle is not energized, for example in a failure situation where the vehicle needs to be towed. To facilitate such operation the inner face of the wall 24 of the plunger 22 is provided with a manually deflectable, integral leg 38 which is accessible through an aperture (not shown) in the wall of the plunger 22. An operator inserts a tool, such as a small screwdriver, through the aperture in the wall of the plunger 22 to deflect the leg 38 to abut the flange 33 of the plunger 28, while at the same time applying pressure to the release button of the selector lever to depress the pushrod 11 against the cam 35. In this situation, the cam 35 will move against the action of the spring 26 as described above, but by virtue of the deflected leg 38 the plunger 28 will move with the plunger 22, and thus both plungers will move together against the action of their springs 26, 34. As both plungers are moving together then the extension 29 does not remain in place impeding the movement of the pushrod 11 and the latch mechanism locking the selector lever in the park position can be released.

Figure 2:
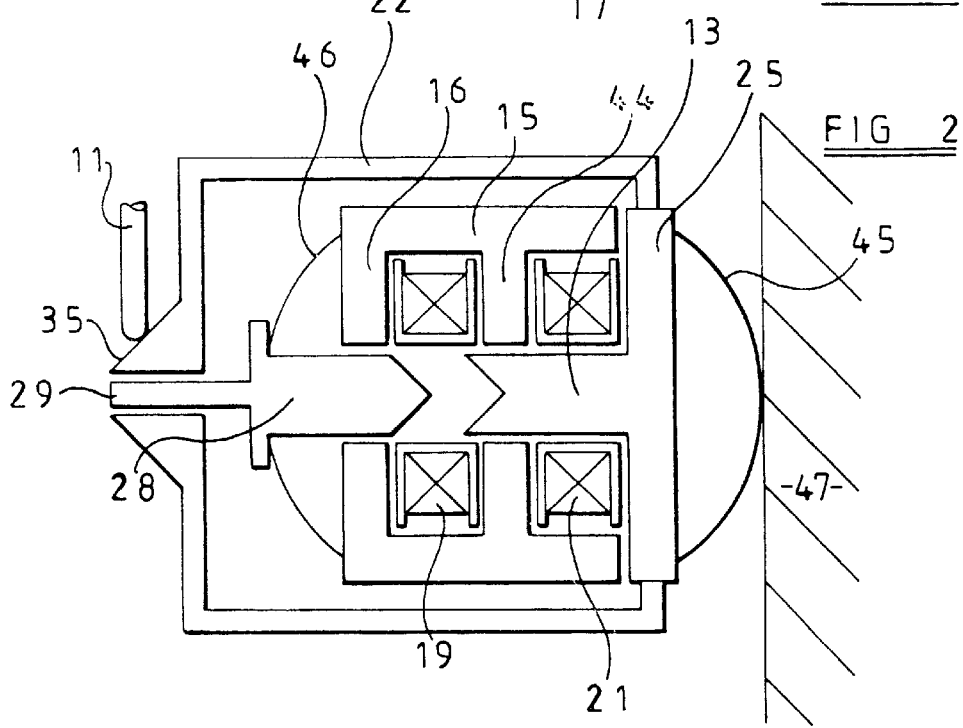
FIG. 2 is a view similar to FIG. 1 of a modification.

In the arrangement illustrated in FIG. 2 the operating principle is extremely similar, but the fixed, support member, is defined by the frame 15 and flange 6, and the flange 14 of the core 13 is replaced by a flange 44 extending radially inwardly from the frame 15. The core 13 has the disc 25 integral therewith and thus the core and disc move as one relative to the frame 15. The return spring of the plunger 22 is replaced by a bowed leaf spring, or dished spring disc 45 acting between the outer face of the disc 25 and a fixed abutment 47 to which the frame 15 is anchored. Similarly the return spring of the plunger 28 is replaced by a dished spring washer 46 acting between the flange 16 and the plunger 28.

In some selector mechanisms the release button will move a bell crank lever one limb of which cooperates with the cam 35 in place of the pushrod 11. The operation of the actuator 12 is unchanged.

What is claimed is:

1. An electrical park lock actuator for the selector lever of a vehicle automatic transmission selector mechanism of the kind in which a manually movable release element must be moved to a release position before the selector lever can be moved from a "PARK" position, the park lock actuator comprising:

a support member which, in use, is fixed;

first and second electromagnet windings carried by said support member;

a cam member carried by said support member and movable relative thereto between a rest position and displaced position the cam member having a cam surface for engagement by said release element;

resilient means urging said cam member to said rest position;

electromagnet latch means latching said cam member in said rest position by energization of said first electromagnet winding, said cam member being displaceable from said rest position when said first electromagnet winding is de-energized by a camming interaction between said cam surface and said manually movable release element as said manually movable release element is moved towards its release position;

an electromagnet plunger carried by said support member and associated with said second electromagnet winding, and resilient means urging said electromagnet plunger to a rest position from which it can be moved to a release position by energization of said second electromagnet winding, said plunger, in its rest position, preventing said release element reaching its release position, and said plunger being housed within said cam member, whereby in use energization of said second electromagnet winding and de-energization of said first electromagnet winding are necessary to permit said release element, in use, to reach its release position.

2. An electrical park latch actuator as claimed in claim 1 wherein said cam member and said electromagnet plunger have their movement axes coextensive.

3. An electrical park latch actuator as claimed in claim 1 wherein said support member includes an electromagnet core common to both electromagnet windings.

4. An electrical park latch actuator as claimed in claim 1 wherein said cam member is hollow and said support member is received therein.

5. An electrical park latch actuator as claimed in claim 1 wherein said support member includes an electromagnet core common to both electromagnet windings and said cam member is hollow and said support member is received therein.

6. An electrical park latch actuator as claimed in claim 1 wherein said first plunger includes a manually operable interlock selectively engageable with said second plunger whereby movement of said first plunger against the action of a respective return spring carries the second plunger with it.

7. An electrical park latch actuator for the automatic transmission selector lever of a road vehicle, said selector lever having a manually operable release button, the actuator including a support member, first and second electromagnet windings carried by the support member, said support member including an electromagnet core common to both electromagnet windings and first and second plungers moveable relative to the support member and responsive to energization of the first and second electromagnet windings respectively, said first and second plungers being positioned with their movement axes coextensive, said first plunger being hollow and receiving said support member therein, and part of said second plunger being slidably received within said first plunger, said first and second plungers being urged by respective return springs into the path of movement of an element moveable with the release button of the associated transmission selector lever in use, and said first plunger including a cam surface cooperable with said element.

\* \* \* \* \*